(12) United States Patent
Norling (10) Patent No.: US 11,885,257 B2
(45) Date of Patent: Jan. 30, 2024

(54) PISTON, INTERNAL COMBUSTION ENGINE, AND VEHICLE

(71) Applicant: Scania CV AB, Södertälje (SE)

(72) Inventor: Daniel Norling, Huddinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/999,424

(22) PCT Filed: May 25, 2021

(86) PCT No.: PCT/SE2021/050489
§ 371 (c)(1),
(2) Date: Nov. 21, 2022

(87) PCT Pub. No.: WO2021/242164
PCT Pub. Date: Dec. 2, 2021

(65) Prior Publication Data
US 2023/0272736 A1 Aug. 31, 2023

(30) Foreign Application Priority Data
May 27, 2020 (SE) .................................. 2050609-3

(51) Int. Cl.
*F02B 23/06* (2006.01)
*F02F 3/26* (2006.01)

(52) U.S. Cl.
CPC ...... *F02B 23/0678* (2013.01); *F02B 23/0669* (2013.01); *F02B 23/0672* (2013.01); *F02F 3/26* (2013.01)

(58) Field of Classification Search
CPC ............. F02B 23/0678; F02B 23/0669; F02B 23/0672; F02F 3/26
(Continued)

(56) References Cited

U.S. PATENT DOCUMENTS

| | | | |
|---|---|---|---|
| 8,020,530 B2 * | 9/2011 | Taylor | F02F 3/28 123/193.6 |
| 8,424,506 B2 * | 4/2013 | Hasegawa | F02B 23/0624 123/193.6 |

(Continued)

FOREIGN PATENT DOCUMENTS

| | | |
|---|---|---|
| CN | 1558094 A | 12/2004 |
| EP | 2204559 A1 | 7/2010 |

(Continued)

OTHER PUBLICATIONS

Jun. 7, 2021—(WO) International Search Report & Written Opinion—App. No. PCT/SE2021/050489.

(Continued)

*Primary Examiner* — Hai H Huynh
(74) *Attorney, Agent, or Firm* — Banner & Witcoff, Ltd.

(57) ABSTRACT

A piston for an internal combustion engine is disclosed. The piston is configured to reciprocate along a centre axis of the piston during operation in an engine. The piston comprises a number of fuel directing surfaces arranged at a distance from a top surface of the piston measured along the centre axis. Each fuel directing surface is configured to direct a fuel spray sprayed onto the fuel directing surface. The fuel directing surfaces are arranged with gaps between two adjacent fuel directing surfaces. The present disclosure further relates to an engine comprising a piston and a vehicle comprising an internal combustion engine.

19 Claims, 4 Drawing Sheets

(58) Field of Classification Search
USPC .................................. 123/298, 301, 193.6
See application file for complete search history.

(56) References Cited

U.S. PATENT DOCUMENTS

| | | | |
|---|---|---|---|
| 10,731,544 B2* | 8/2020 | Svensson | F02M 61/182 |
| 11,293,374 B2* | 4/2022 | Joshi | F02B 23/0624 |
| 2011/0083638 A1 | 4/2011 | Stovell | |
| 2011/0259297 A1 | 10/2011 | Rothbauer et al. | |
| 2019/0242295 A1 | 8/2019 | Tanno | |
| 2020/0232416 A1* | 7/2020 | Primus | F02B 23/0687 |

FOREIGN PATENT DOCUMENTS

| | | |
|---|---|---|
| JP | S507911 A | 1/1975 |
| JP | S517501 U | 1/1976 |
| JP | S62195408 A | 8/1987 |
| JP | S62240419 A | 10/1987 |
| JP | H01127931 U | 8/1989 |
| JP | H04124443 A | 4/1992 |
| JP | H11210468 A | 8/1999 |
| JP | 2018204516 A | 12/2018 |
| JP | 2019190293 A | 10/2019 |
| WO | 2008157471 A1 | 12/2008 |
| WO | 2019231386 A1 | 12/2019 |

OTHER PUBLICATIONS

Dec. 14, 2020—(SE) Office Action—App. No. 2050609-3.
Jun. 3, 2021—(SE) Office Action—App. No. 2050609-3.
Feb. 4, 2020—(SE) Technology Search Report—App. No. 2050609-3.

* cited by examiner

Fig. 6

PISTON, INTERNAL COMBUSTION ENGINE, AND VEHICLE

CROSS-REFERENCE TO RELATED APPLICATIONS

The present application claims priority from and is a U.S. National Phase of International Application No. PCT/SE2021/050489, which was filed on May 25, 2021, designating the United States of America and claiming priority to Swedish Patent Application No. 2050609-3, filed on May 27, 2020. This application claims priority to and the benefit of the above-identified applications, which are all fully incorporated by reference herein in their entireties.

TECHNICAL FIELD

The present disclosure relates to a piston for an internal combustion engine. The present disclosure further relates to an internal combustion engine comprising a cylinder and a piston configured to reciprocate in the cylinder. Furthermore, the present disclosure relates to a vehicle comprising an internal combustion engine.

BACKGROUND

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning the crankshaft. A stroke refers to the full travel of the piston along the cylinder, in either direction. The uppermost position of the piston in the cylinder is usually referred to as the top dead centre TDC, and the lowermost position of the piston in the cylinder is usually referred to as the bottom dead centre BDC. The strokes are completed in the following order, inlet stroke, compression stroke, expansion stroke and exhaust stroke.

Compression ignition engines, such as diesel engines, comprise a fuel injector arranged in each cylinder of the engine. Moreover, many modern spark ignition engines, such as gasoline engines, comprise a fuel injector arranged in each cylinder of the engine. These types of engines are usually referred to as direct injection engines. The fuel injector usually comprises a number of orifices and a needle configured to control flow of fuel through the orifices. The fuel injector is usually controlled to inject fuel into the cylinder towards the end of the compression stroke of the current cylinder. Somewhat conical fuel sprays are formed in the cylinder when fuel is sprayed into the cylinder via the orifices.

Fuel consumption is a main concern for internal combustion engines. Two ways of improving the fuel efficiency of an engine is to reduce the transfer of heat to walls of the combustion chamber and to increase the combustion heat release. Combustion heat release is a measure of burn rate, i.e. the rate at which the fuel is burning, and can be improved by improving the mixing rate between air and the fuel. The transfer of heat to walls of the combustion chamber and combustion heat release are normally conflicting requirements. That is, when increasing the combustion heat release, the transfer of heat to walls of the combustion chamber is normally increased, and vice versa.

Moreover, when injecting a fuel spray into a cylinder, a stoichiometric zone is formed around the fuel spray. In this zone, there is a stoichiometric ratio between fuel and air. Such a zone is sometimes referred to as a stoichiometric surface area of the fuel spray. Stoichiometric combustion is advantageous for the heat release and the fuel efficiency of the engine. However, fuel nozzles and combustion chambers of engines put limitations on the size of the stoichiometric surface area.

SUMMARY

It is an object of the present invention to overcome, or at least alleviate, at least some of the above-mentioned problems and drawbacks.

According to a first aspect of the invention, the object is achieved by a piston for an internal combustion engine. The piston is configured to reciprocate along a centre axis of the piston during operation in an engine. The piston comprises a number of fuel directing surfaces arranged at a distance from a top surface of the piston measured along the centre axis. Each fuel directing surface is configured to direct a fuel spray sprayed onto the fuel directing surface. The fuel directing surfaces are arranged with gaps between two adjacent fuel directing surfaces.

Since the fuel directing surfaces are arranged with gaps between two adjacent fuel directing surfaces, air can flow through the gaps into fuel sprays directed by the fuel directing surfaces. In this manner, an improved mixing rate between air and fuel is provided. Thereby, a piston is provided having conditions for improving the combustion heat release without significantly affecting the heat transfer to walls of a combustion chamber. Accordingly, a piston is provided having conditions for improving the fuel efficiency of an engine.

In addition, since each fuel directing surface is configured to direct a fuel spray sprayed onto the fuel directing surface, each fuel spray is obtaining a more flattened cross section after having been directed by a fuel direction surface. That is, somewhat conical fuel sprays are formed in a cylinder when fuel is sprayed freely into a cylinder via orifices of an injector. Conical fuel sprays have a circular cross section in a direction perpendicular to the spraying direction. However, since each fuel directing surface is configured to direct a fuel spray sprayed onto the fuel directing surface, more flattened fuel sprays are provided after the impact between the fuel sprays and the respective fuel directing surface. The flattened fuel sprays have a more elliptical cross section in a direction perpendicular to the spraying direction than a conical fuel spray. Accordingly, the flattened fuel sprays have a greater surface to volume ratio than a conical fuel spray which provides a greater surface area for mixing of air and fuel. Consequently, the flattened fuel sprays have a greater stoichiometric surface area of the fuel spray than a conical fuel spray. As a result thereof, a piston is provided having conditions for improving the combustion heat release without significantly affecting the heat transfer to walls of a combustion chamber. Accordingly, also for this reason, a piston is provided having conditions for improving the fuel efficiency of an engine.

Accordingly, a piston is provided overcoming, or at least alleviating, at least some of the above-mentioned problems and drawbacks. As a result, the above-mentioned object is achieved.

Optionally, each fuel directing surface comprises a trailing edge, and wherein the gaps are formed in a circumferential direction between trailing edges of two adjacent fuel directing surfaces. Thereby, a piston is provided allowing an efficient flow of air into fuel sprays via the gaps between the trailing edges of the fuel directing surfaces. Thereby, a piston is provided having conditions for improving the combustion heat release without significantly affecting the heat transfer to walls of a combustion chamber.

Optionally, the piston comprises a piston bowl, and wherein the number of fuel directing surfaces are arranged in the piston bowl. Thereby, a piston is provided capable of directing fuel sprays into the piston bowl of the piston. Thus, a piston is provided having conditions for improving the combustion heat release without significantly affecting the heat transfer to walls of a combustion chamber.

Optionally, the number of fuel directing surfaces are distributed around the centre axis of the piston. Thereby, a piston is provided capable of directing fuel sprays into a combustion chamber in a uniform and well distributed manner. Thereby, conditions are provided for an improved air/fuel mixing rate and thus also an improved combustion heat release. Moreover, conditions are provided for relative short distances between orifices of an injector and the fuel directing surfaces. Thereby, conditions are provided for reducing the interaction between flames and walls of a combustion chamber, and thus also the heat transfer to walls of a combustion chamber.

Optionally, the piston comprises a central protrusion protruding from the top surface of the piston at a position between the number of fuel directing surfaces. Thereby, a piston is provided capable of obtaining a high compression ratio in a cylinder, and/or providing conditions for a larger piston bowl without reducing the compression ratio in a cylinder.

Optionally, the central protrusion is conical or frustoconical. Thereby, an efficient structure is provided capable of obtaining a high compression ratio in a cylinder while allowing fuel sprays to be located adjacent to sides of the central protrusion. Thereby, the available space in a combustion chamber of an engine comprising the piston can be utilized in an efficient manner.

Optionally, at least one of the fuel directing surfaces comprises an arc-shaped trailing edge having a radius of curvature smaller than the radial distance from the centre axis to the arc-shaped trailing edge. Thereby, a piston is provided capable of directing fuel sprays in an efficient manner, while providing conditions for an efficient airflow through the gaps into fuel sprays directed by the fuel directing surfaces.

Optionally, the radius of curvature is smaller than 70% of the radial distance from the centre axis to the arc-shaped trailing edge. Thereby, a piston is provided capable of directing fuel sprays in an efficient manner, while providing conditions for an efficient airflow through the gaps into fuel sprays directed by the fuel directing surfaces.

Optionally, the radial distances from the centre axis to trailing edges of the fuel directing surfaces is 10%-50% greater than the radial distances from the centre axis to radially inner delimiting surfaces of the gaps. Thereby, conditions are provided for an efficient airflow through the gaps into fuel sprays directed by the fuel directing surfaces.

Optionally, the radial distances from the centre axis to trailing edges of the fuel directing surfaces is within the range of 25%-70% of the radius of the piston or is within the range of 35%-55% of the radius of the piston. Thereby, conditions are provided for relative short distances between orifices of an injector and the fuel directing surfaces. Thereby, conditions are provided for reducing the interaction between flames and walls of a combustion chamber, and thus also the heat transfer to walls of a combustion chamber.

Optionally, the fuel directing surfaces are inclined relative to a radial direction of the piston. Thereby, conditions are provided for directing the fuel sprays to directions reducing the interaction between flames and walls of a combustion chamber. In this manner, the heat transfer to walls of a combustion chamber can be reduced.

Optionally, the fuel directing surfaces are inclined with a positive pitch angle relative to a radial direction of the piston. Thereby, conditions are provided for directing the fuel sprays to directions reducing the interaction between flames and walls of a combustion chamber. In this manner, the heat transfer to walls of a combustion chamber can be reduced.

Optionally, the positive pitch angle is within the range of 3 degrees to 14 degrees or is within the range of 4.5 degrees to 7.5 degrees. Thereby, conditions are provided for directing the fuel sprays to directions reducing the interaction between flames and walls of a combustion chamber. In this manner, the heat transfer to walls of a combustion chamber can be reduced.

Optionally, the distances between trailing edges of the fuel directing surfaces and the top surface of the piston adjacent to the trailing edges, measured along the centre axis, is within the range of 3%-25% of the radius of the piston or is within the range of 7%-14% of the radius of the piston. Thereby, conditions are provided for an efficient airflow through the gaps into fuel sprays directed by the fuel directing surfaces. Moreover, conditions are provided for an efficient flow of air into fuel sprays from the areas between the top surface of the piston and the trailing edges of the fuel directing surfaces.

Optionally, the piston is a piston for a compression ignition engine. Thereby, a piston for a compression ignition engine is provided having conditions for improving the combustion heat release without significantly affecting the heat transfer to walls of a combustion chamber. Accordingly, a piston is provided having conditions for improving the fuel efficiency of a compression ignition engine.

According to a second aspect of the invention, the object is achieved by an internal combustion engine comprising a cylinder and a piston according to some embodiments of the present disclosure, wherein the piston is configured to reciprocate in the cylinder.

Since the internal combustion engine comprises a piston according to some embodiments, an engine is provided having conditions for improving the combustion heat release without significantly affecting the heat transfer to walls of a combustion chamber. Accordingly, an internal combustion engine is provided having conditions for improved fuel efficiency.

Accordingly, an internal combustion engine is provided overcoming, or at least alleviating, at least some of the above-mentioned problems and drawbacks. As a result, the above-mentioned object is achieved.

Optionally, the engine comprises a fuel injector comprising a number of orifices, wherein each orifice is configured to spray a fuel spray onto a fuel directing surface of the piston. Thereby, an engine is provided capable of directing fuel sprays in an efficient manner so as to improve the combustion heat release without significantly affecting the heat transfer to walls of a combustion chamber of the engine.

Optionally, the centre axis of the piston extends through the fuel injector. Thereby, an engine is provided capable of directing fuel sprays into a combustion chamber in a uniform and well distributed manner. Thereby, conditions are provided for an improved air/fuel mixing rate and thus also an improved combustion heat release. Moreover, conditions are provided for relative short distances between orifices of an injector of the engine and the fuel directing surfaces. Thereby, conditions are provided for reducing the interaction between flames and walls of a combustion chamber, and thus also the heat transfer to walls of a combustion chamber of the engine.

Optionally, the engine is a compression ignition engine. Thereby, a compression ignition engine is provided having conditions for improving the combustion heat release without significantly affecting the heat transfer to walls of a combustion chamber. Accordingly, a compression ignition engine is provided having conditions for improved fuel efficiency.

According to a third aspect of the invention, the object is achieved by a vehicle comprising an internal combustion engine according to some embodiments of the present disclosure.

Thereby, a vehicle is provided having conditions for improved fuel efficiency. Accordingly, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
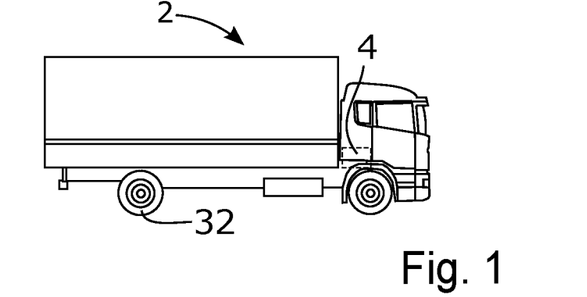
FIG. 1 illustrates a vehicle according to some embodiments.

FIG. 1 illustrates a vehicle 2 according to some embodiments. The vehicle 2 comprises an internal combustion engine 4. The internal combustion engine 4 is configured to provide motive power to the vehicle 2 via wheels 32 of the vehicle 2.

According to the illustrated embodiments, the vehicle 2 is a truck. However, according to further embodiments, the vehicle 2, as referred to herein, may be another type of manned or unmanned vehicle for land or water based propulsion such as a lorry, a bus, a construction vehicle, a tractor, a car, a ship, a boat, or the like.

Figure 2:
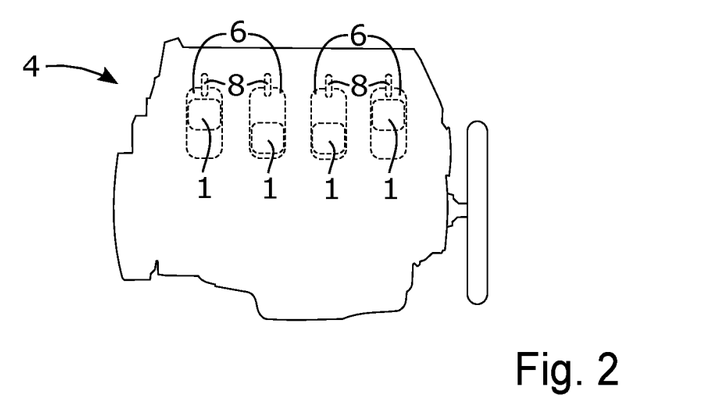
FIG. 2 schematically illustrates an internal combustion engine of the vehicle illustrated in FIG. 1.

FIG. 2 schematically illustrates the internal combustion engine 4 of the vehicle 2 illustrated in FIG. 1. The internal combustion engine 4 is in some places herein referred to as the "engine 4" for the reason of brevity and clarity. As indicated above, the engine 4 is configured to provide motive power to a vehicle comprising the engine 4. However, according to further embodiments, the engine 4, as referred to herein, may be a stationary engine, such as an engine configured to power a generator for producing electricity. The internal combustion engine 4 comprises a number of pistons 1 each configured to reciprocate in respective cylinder 6 of the internal combustion engine 4. According to the illustrated embodiments, the engine 4 comprises four cylinders 6 and four pistons 1. According to further embodiments, the engine 4 may comprise another number of cylinders 6 and pistons 1.

The internal combustion engine 4 comprises a fuel injector 8 arranged in each cylinder 6. The fuel injectors 8 are configured to inject fuel directly into a cylinder 6 of the internal combustion engine 4. Therefore, the internal combustion engine 4 as referred to herein, may also be referred to as a "direct injection engine". Moreover, according to the illustrated embodiments, the internal combustion engine 4 is a four-stroke engine. Therefore, the internal combustion engine 4 as referred to herein, may also be referred to as a "four-stroke internal combustion engine", "a direct injected four-stroke internal combustion engine", or the like.

Moreover, according to the illustrated embodiments, the internal combustion engine 4 is a diesel engine. According to further embodiments, the internal combustion engine 4, as referred to herein, may be another type of compression ignition engine, or an Otto engine with a spark-ignition device, wherein the Otto engine may be configured to run on gas, petrol, alcohol, similar volatile fuels, or combinations thereof.

Figure 3:
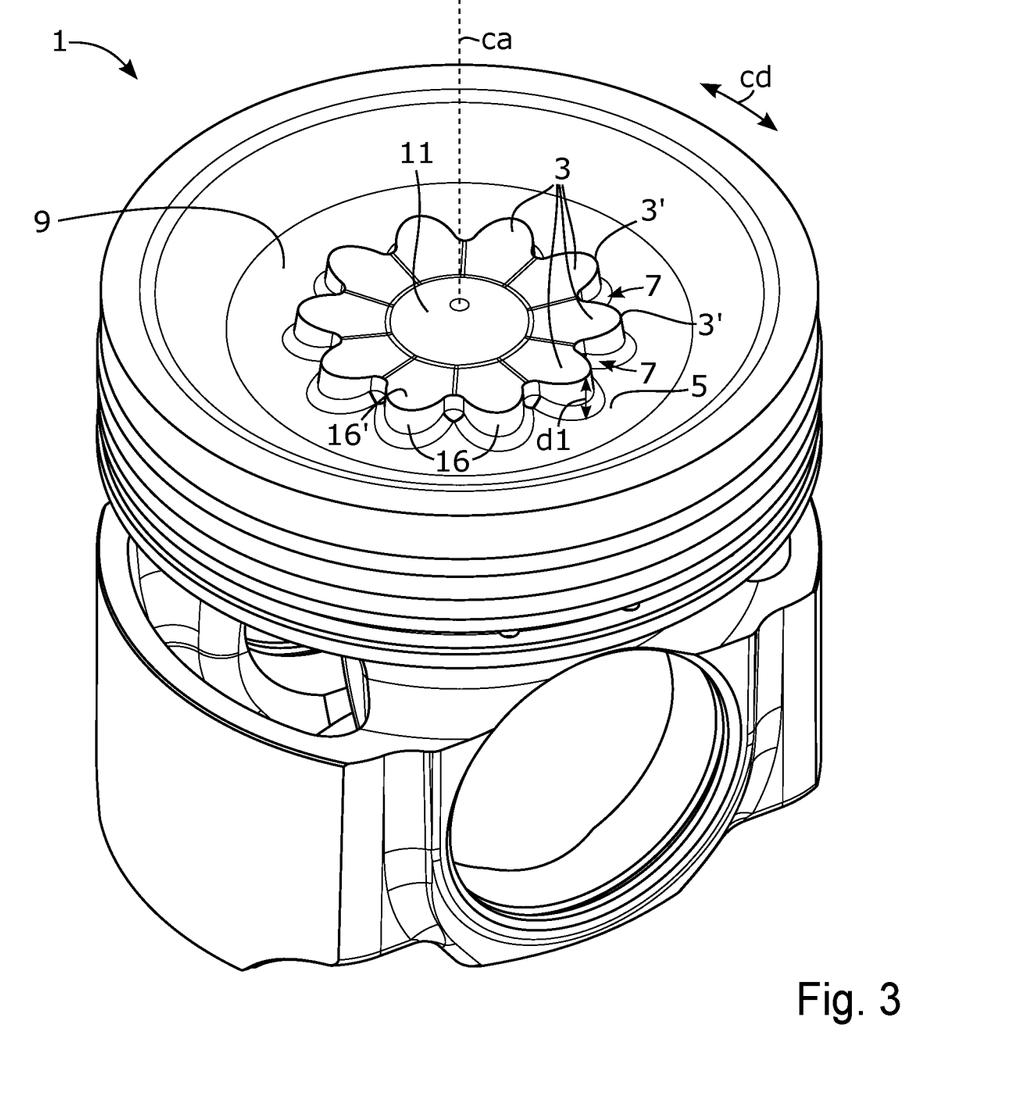
FIG. 3 illustrates a perspective view of a piston of the internal combustion engine illustrated in FIG. 2.

FIG. 3 illustrates a perspective view of a piston 1 of the internal combustion engine 4 illustrated in FIG. 2. The piston 1 is configured to reciprocate along a centre axis ca of the piston 1 during operation in an engine. The centre axis ca of the piston 1 coincides with a centre axis of a cylinder of an engine when the piston 1 is arranged in the cylinder of the engine.

As can be seen in FIG. 3, the piston 1 comprises a number of fuel directing surfaces 3. The fuel directing surfaces 3 are arranged at a distance dl from a top surface 5 of the piston 1 measured along the centre axis ca. That is, the piston 1 comprises a protruding area 16 protruding from the top surface 5 of the piston 1. The fuel directing surfaces 3 are arranged on a top surface 16' of the protruding area 16. According to further embodiments, the piston 1 may comprise one protrusion 16 per fuel directing surface 3, wherein each fuel directing surfaces 3 is arranged on a top surface 16' of a protrusion 16. The top surface 5 of the piston 1, as well as the top surface 16' of the protruding area 16, and the fuel directing surfaces 3, face a combustion chamber, and forms a delimiting surface thereof, when the piston 1 is arranged in a cylinder of an engine.

Each fuel directing surface 3 is configured to direct a fuel spray sprayed onto the fuel directing surface 3. Moreover, as is clearly seen in FIG. 3, the fuel directing surfaces 3 are arranged such that gaps 7 are formed between two adjacent fuel directing surfaces 3. In this manner, air can flow through the gaps 7 into fuel sprays sprayed onto the fuel directing surfaces 3. Thereby, an improved mixing rate between air and fuel is provided. Thereby, a piston 1 is provided having conditions for improving the combustion heat release without significantly affecting the heat transfer to walls of a combustion chamber, as is further explained herein.

According to the illustrated embodiments, the piston 1 comprises ten fuel directing surfaces 3. However, only some of the fuel directing surfaces 3 in FIG. 3 have been provided with the reference sign "3", for the reason of brevity and clarity. According to further embodiments, the piston 1 may comprise another number of fuel directing surfaces 3, such as a number between four and sixteen. The piston 1 is configured to be combined with a fuel injector having the same number of orifices as the number of fuel directing surfaces 3 such that each orifice is configured to spray a fuel spray onto a fuel directing surface 3 of the piston 1.

According to the illustrated embodiments, the number of fuel directing surfaces 3 are distributed around the centre axis ca of the piston 1. The centre axis ca of the piston 1 may coincide with a centre axis of a fuel injector when the piston 1 is arranged in a cylinder of an engine.

According to the illustrated embodiments, the fuel directing surfaces 3 are arranged such that gaps 7 are formed between each pair of adjacent fuel directing surfaces 3. Moreover, as seen in FIG. 3, each fuel directing surface 3 comprises a trailing edge 3', and wherein the gaps 7 are formed in a circumferential direction cd of the piston 1 between trailing edges 3' of two adjacent fuel directing surfaces 3.

According to the illustrated embodiments, the piston 1 comprises a piston bowl 9. As indicated above, according to the illustrated embodiments, the piston 1 is a piston 1 for a compression ignition engine. The number of fuel directing surfaces 3 are arranged in the piston bowl 9. Moreover, according to the illustrated embodiments, the piston 1 comprises a central protrusion 11 protruding from the top surface 5 of the piston 1 at a position between the number of fuel directing surfaces 3. According to the illustrated embodiments, the central protrusion 11 is conical. According to further embodiments, the central protrusion 11 may be frusto-conical. According to the illustrated embodiments, a centre axis of the central protrusion 11 coincides with the centre axis ca of the piston 1.

Figure 4:
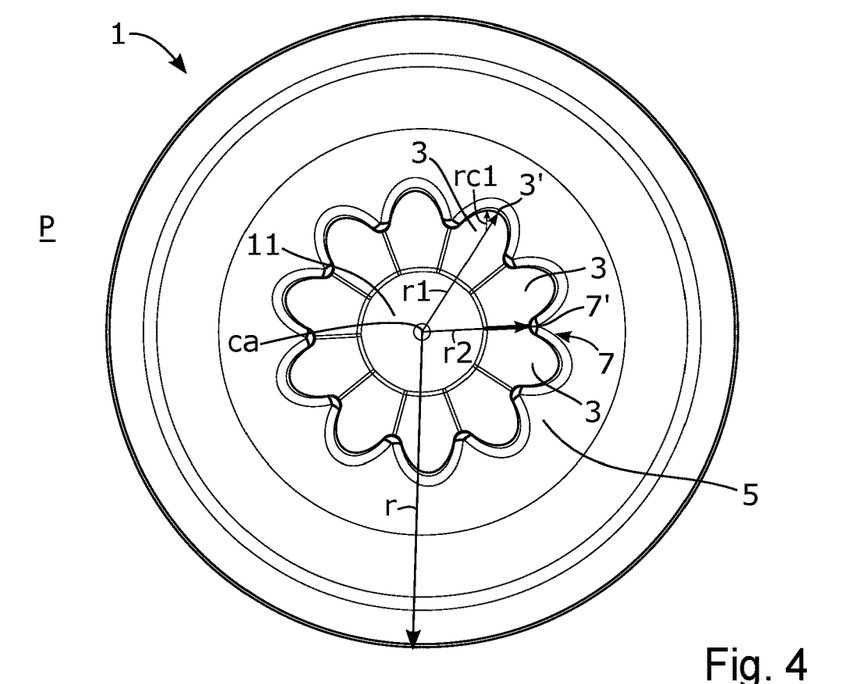
FIG. 4 illustrates a top view of the piston illustrated in FIG. 3.

FIG. 4 illustrates a top view of the piston 1 illustrated in FIG. 3. That is, in FIG. 4, the piston 1 is illustrated as seen in a direction directly towards the top surface 5 of the piston 1, i.e. in a viewing direction coinciding with the centre axis ca of the piston 1.

As can be seen in FIG. 4, as well as in FIG. 3, each of the fuel directing surfaces 3 comprises an arc-shaped trailing edge 3'. As indicated in FIG. 4, each arc-shaped trailing edge 3' has a radius of curvature rc1 smaller than the radial distance r1 from the centre axis ca to the arc-shaped trailing edge 3'. Each arc-shaped trailing edge 3' may have a varying radius of curvature rc1 along the trailing edge 3', as is the case according to the illustrated embodiments. The radius of curvature rc1 is measured in a plane P perpendicular to the centre axis ca. According to the illustrated embodiments, the smallest radius of curvature rc1 of the trailing edges 3' is approximately 13% of the radial distance r1 from the centre axis ca of the piston 1 to the arc-shaped trailing edge 3'. According to further embodiments, the smallest radius of curvature rc1 of the trailing edges 3' may be within the range of 3%-70%, or 7%-25%, of the radial distance r1 from the centre axis ca to the arc-shaped trailing edge 3'.

According to the illustrated embodiments, the radial distances r1 from the centre axis ca of the piston 1 to trailing edges 3' of the fuel directing surfaces 3 is approximately 33% greater than the radial distances r2 from the centre axis ca to radially inner delimiting surfaces 7' of the gaps 7. According to further embodiments, the radial distances r1 from the centre axis ca to trailing edges 3' of the fuel directing surfaces 3 may be 10%-50% greater than the radial distances r2 from the centre axis ca to radially inner delimiting surfaces 7' of the gaps 7.

According to the illustrated embodiments, the radial distances r1 from the centre axis ca of the piston 1 to trailing edges 3' of the fuel directing surfaces 3 is approximately 45% of the radius r of the piston 1. According to further embodiments, the radial distances r1 from the centre axis ca to trailing edges 3' of the fuel directing surfaces 3 may be within the range of 25%-70% of the radius r of the piston 1, or may be within the range of 35%-55% of the radius r of the piston 1.

Figure 5:
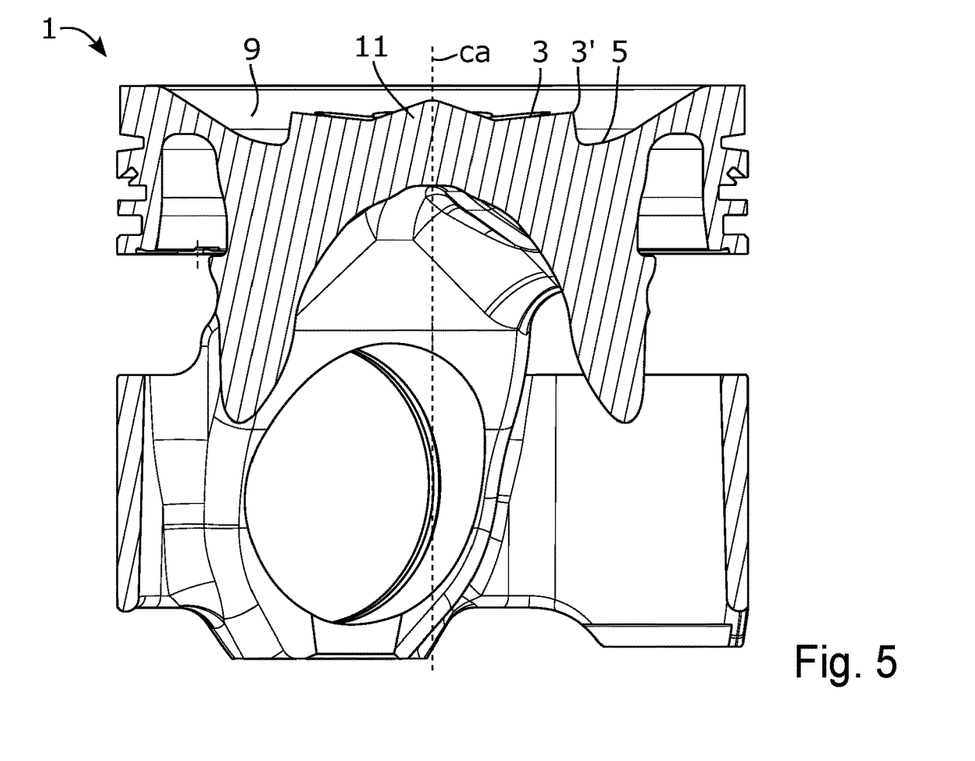
FIG. 5 illustrates a cross section of the piston illustrated in FIG. 3 and FIG. 4.

FIG. 5 illustrates a cross section of the piston 1 illustrated in FIG. 3 and FIG. 4. In FIG. 5, the cross section is made in a plane comprising the centre axis ca of the piston 1. In FIG. 5, a fuel directing surface 3 and a trailing edge 3' of the fuel directing surface 3 are indicated. Moreover, in FIG. 5, the top surface 5, the piston bowl 9, and the central protrusion 11 of the piston 5 are indicated.

Figure 6:
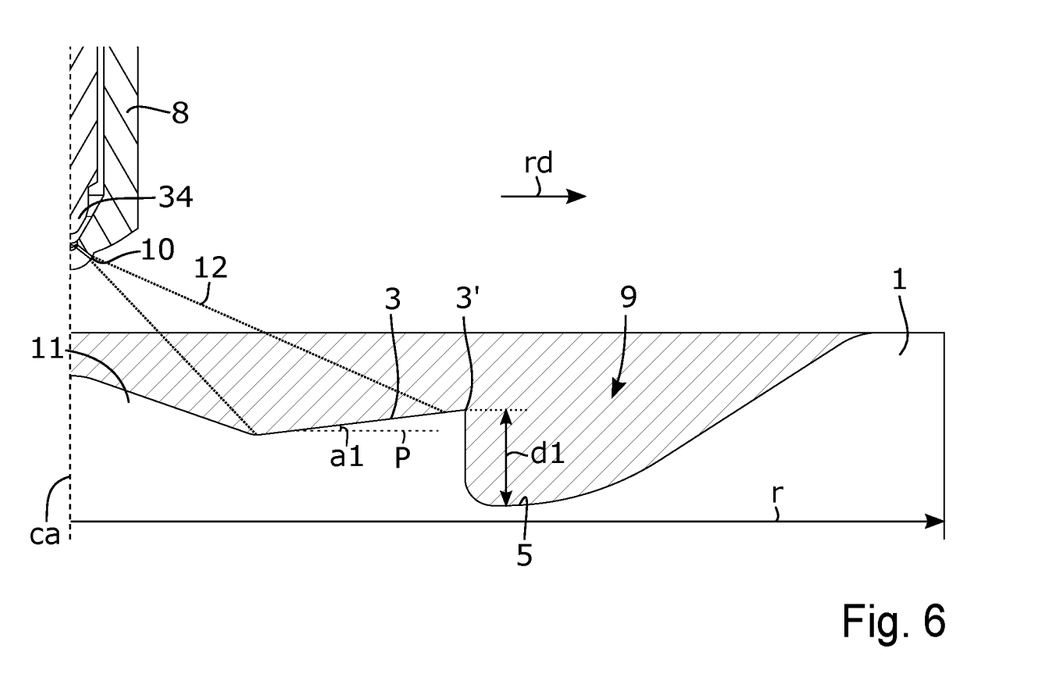
FIG. 6 illustrates a portion of the cross section illustrated in FIG. 5.

FIG. 6 illustrates a portion of the cross section illustrated in FIG. 5. Moreover, in FIG. 6, a cross section of a fuel injector 8 is schematically illustrated. The fuel injector 8 is arranged such that a centre axis thereof coincides with the centre axis ca of the piston 1. In other words, according to the illustrated embodiments, the centre axis ca of the piston 1 extends through the fuel injector 8. The fuel injector 8 comprises a needle 34 and a number of orifices 10. The position of the needle 34 controls flow of fuel trough the orifices 10. In FIG. 6, only one orifice is seen. However, as mentioned above, the fuel injector 8 may comprise the same number of orifices 10 as the number of fuel directing surfaces 3 of the piston 1. Each orifice is configured to spray a fuel spray 12 onto a fuel directing surface 3 of the piston 1. In FIG. 6, such a fuel spray 12 is schematically illustrated.

According to the illustrated embodiments, the fuel directing surfaces 3 are inclined relative to a radial direction rd of the piston 1. As indicated in FIG. 6, radial directions rd of the piston 1 crosses the centre axis ca of the piston 1 and are parallel to a plane P perpendicular to the centre axis ca of the piston 1. In more detail, according to the illustrated embodiments, the fuel directing surfaces 3 are inclined with a positive pitch angle a1 relative to the radial direction rd of the piston 1. The definition "positive pitch angle a1", as used herein, is an angle a1 the fuel directing surfaces 3 causing a distance between the fuel directing surface 3 and the top surface 5 of the piston 1, adjacent to the fuel directing surface 3, to increase along the fuel directing surface 3, seen in a radial direction r of the piston 1 pointing in a directing from the centre axis ca of the piston 1.

According to the illustrated embodiments, the positive pitch angle a1 is approximately 6 degrees. According to further embodiments, the positive pitch angle a1 may be within the range of 3 degrees to 14 degrees or may be within the range of 4.5 degrees to 7.5 degrees. In this manner, the fuel of the fuel spray 12 impacting a fuel directing surface 3 can bounce against the fuel directing surface 3 into a direction reducing the interaction between the flame and walls of a combustion chamber. In this manner, the heat transfer to walls of a combustion chamber can be further reduced. According to still further embodiments, one or more of the fuel directing surfaces 3 may be inclined with a negative pitch angle a1 relative to the radial direction rd of the piston 1.

According to the illustrated embodiments, the distances dl between trailing edges 3' of the fuel directing surfaces 3 and the top surface 5 of the piston 1 adjacent to the trailing edges 3', measured along the centre axis ca, is approximately 10.5% of the radius r of the piston 1. According to further embodiments, the distances dl between trailing edges 3' of the fuel directing surfaces 3 and the top surface 5 of the piston 1 adjacent to the trailing edges 3', measured along the centre axis ca, may be within the range of 3%-25% of the radius r of the piston 1 or may be within the range of 7%-14% of the radius r of the piston 1. Thereby, air can be transported in an efficient manner into fuel sprays 12 bouncing of the fuel directing surfaces 3 from the area between the top surface 5 of the piston 1 and the trailing edges 3' of the fuel direction surfaces 3.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A piston for an internal combustion engine, the piston being configured to reciprocate along a centre axis of the piston during operation in an engine,
    wherein the piston comprises a number of fuel directing surfaces arranged at a distance from a top surface of the piston measured along the centre axis,
    each fuel directing surface being configured to direct a fuel spray sprayed onto the fuel directing surface,
    and wherein the fuel directing surfaces are arranged with gaps between two adjacent fuel directing surfaces, wherein each fuel directing surface comprises a trailing edge, and wherein the gaps are formed in a circumferential direction between trailing edges of two adjacent fuel directing surfaces.

2. The piston according to claim 1, wherein the piston comprises a piston bowl, and wherein the number of fuel directing surfaces are arranged in the piston bowl.

3. The piston according to claim 1, wherein the number of fuel directing surfaces are distributed around the centre axis of the piston.

4. The piston according to claim 1, wherein the piston comprises a central protrusion protruding from the top surface of the piston at a position between the number of fuel directing surfaces.

5. The piston according to claim 4, wherein the central protrusion is conical or frusto-conical.

6. The piston according to claim 1, wherein at least one of the fuel directing surfaces comprises an arc-shaped trailing edge having a radius of curvature smaller than the radial distance from the centre axis to the arc-shaped trailing edge.

7. The piston according to claim 6, wherein the radius of curvature is at least one of: smaller than 70% of the radial distance from the centre axis to the arc-shaped trailing edge, and measured in a plane perpendicular to the centre axis.

8. The piston according to claim 1, wherein the radial distances from the centre axis to trailing edges of the fuel directing surfaces is 10%-50% greater than the radial distance from the centre axis to radially inner delimiting surfaces of the gaps.

9. The piston according to claim 1, wherein the radial distances from the centre axis to trailing edges of the fuel directing surfaces is within the range of 25%-70% of the radius of the piston, or is within the range of 35%-55% of the radius of the piston.

10. The piston according to claim 1, wherein the fuel directing surfaces are inclined relative to a radial direction of the piston.

11. The piston according to claim 1, wherein the fuel directing surfaces are inclined with a positive pitch angle relative to a radial direction of the piston.

12. The piston according to claim 11, wherein the positive pitch angle is within the range of 3 degrees to 14 degrees or is within the range of 4.5 degrees to 7.5 degrees.

13. The piston according to claim 1, wherein the distances between trailing edges of the fuel directing surfaces and the top surface of the piston adjacent to the trailing edges, measured along the centre axis, is within the range of 3%-25% of the radius of the piston or is within the range of 7%-14% of the radius of the piston.

14. The piston according to claim 1, wherein the piston is a piston for a compression ignition engine.

15. An internal combustion engine comprising: a cylinder, and a piston according to claim 1, wherein the piston is configured to reciprocate in the cylinder.

16. The engine according to claim 15, wherein the engine comprises a fuel injector comprising a number of orifices, and wherein each orifice is configured to spray a fuel spray onto a fuel directing surface of the piston.

17. The engine according to claim 16, wherein the centre axis of the piston extends through the fuel injector.

18. The engine according to claim 15, wherein the engine is a compression ignition engine.

19. A vehicle comprising an internal combustion engine according to claim 15.

* * * * *